US008972498B2

(12) United States Patent
Zheng (10) Patent No.: US 8,972,498 B2
(45) Date of Patent: Mar. 3, 2015

(54) MOBILE-BASED REALTIME LOCATION-SENSITIVE SOCIAL EVENT ENGINE

(75) Inventor: Zhaohui Zheng, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 198 days.

(21) Appl. No.: 13/463,109

(22) Filed: May 3, 2012

(65) Prior Publication Data

US 2013/0297688 A1    Nov. 7, 2013

(51) Int. Cl.
*G06F 15/16* (2006.01)
(52) U.S. Cl.
USPC ........................................ 709/204; 455/456.3
(58) Field of Classification Search
USPC ........................................ 709/204; 455/456.3
See application file for complete search history.

(56) References Cited

U.S. PATENT DOCUMENTS

| 7,848,765 | B2 * | 12/2010 | Phillips et al. | 455/456.3 |
| 8,463,295 | B1 * | 6/2013 | Caralis et al. | 455/456.3 |
| 2011/0301941 | A1 * | 12/2011 | De Vocht | 704/9 |

* cited by examiner

*Primary Examiner* — Yves Dalencourt
(74) *Attorney, Agent, or Firm* — Buchenhorner Patent Law (57) ABSTRACT

Performing an on-line recommendation includes: analyzing real-time data from various sources; determining, from the analysis, events in which a user may be interested; extracting the determined events; storing the extracted events in a data store; and performing a recommendation function. The recommendation function includes: ranking the extracted events to determine the events in which the user is most likely to be interested; and performing location-based filtering, retaining those extracted events that are within a geo-location range proximate to the user, thus generating optimal events.

15 Claims, 7 Drawing Sheets

MOBILE-BASED REALTIME LOCATION-SENSITIVE SOCIAL EVENT ENGINE

CROSS-REFERENCE TO RELATED APPLICATIONS

This application references technology disclosed in commonly-owned, co-pending U.S. patent application Ser. No. 12/862,324, filed on Aug. 24, 2010 and entitled "Haptic Search Feature for Touch Screens;" which application is incorporated by reference in its entirety herein.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of on-line social event processing, and more particularly relates to location-sensitive on-line social events.

BACKGROUND OF THE INVENTION

More and more Internet users are accessing the web through their mobile phones. The mobile phone has moved beyond providing telephone service. It is a communicator, organizer, social planner, shopping assistant, photo album, and so much more. Mobile phones help to keep their users up-to-date and informed by providing the boundless wealth of knowledge from the Internet in a portable device. It's no wonder the mobile phone is ubiquitous in our society and its use is growing.

However, with this wealth of information so readily available, a mobile device user is still hard-pressed to find meaningful information on events within the user's location that accommodates the user's tastes.

SUMMARY OF THE INVENTION

Briefly, according to an embodiment of the invention a method for performing an on-line recommendation includes steps or acts of: analyzing real-time data from various sources; determining, from the analysis, events in which a user may be interested; extracting the determined events to store in a data store; and performing a recommendation function. The recommendation function includes: ranking the extracted events to determine the events in which the user is most likely to be interested; performing location-based filtering to retain those extracted events that are within a geo-location range proximate to the user to generate optimal events; and providing the optimal events on a mobile device.

According to another embodiment of the present invention, a computer system for performing an on-line recommendation includes: a memory with computer-executable instructions stored therein; and a processor device operably coupled with the memory for executing the computer-executable instructions. The computer-executable instructions, when executed, cause a computer to perform the above-stated method for performing an on-line recommendation.

According to another embodiment of the present invention, a computer program product includes a non-transitory computer readable storage medium with program instructions stored therein. The program instructions, when executed by a computer, cause the computer to perform the above method for performing an on-line recommendation.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Figure 1:
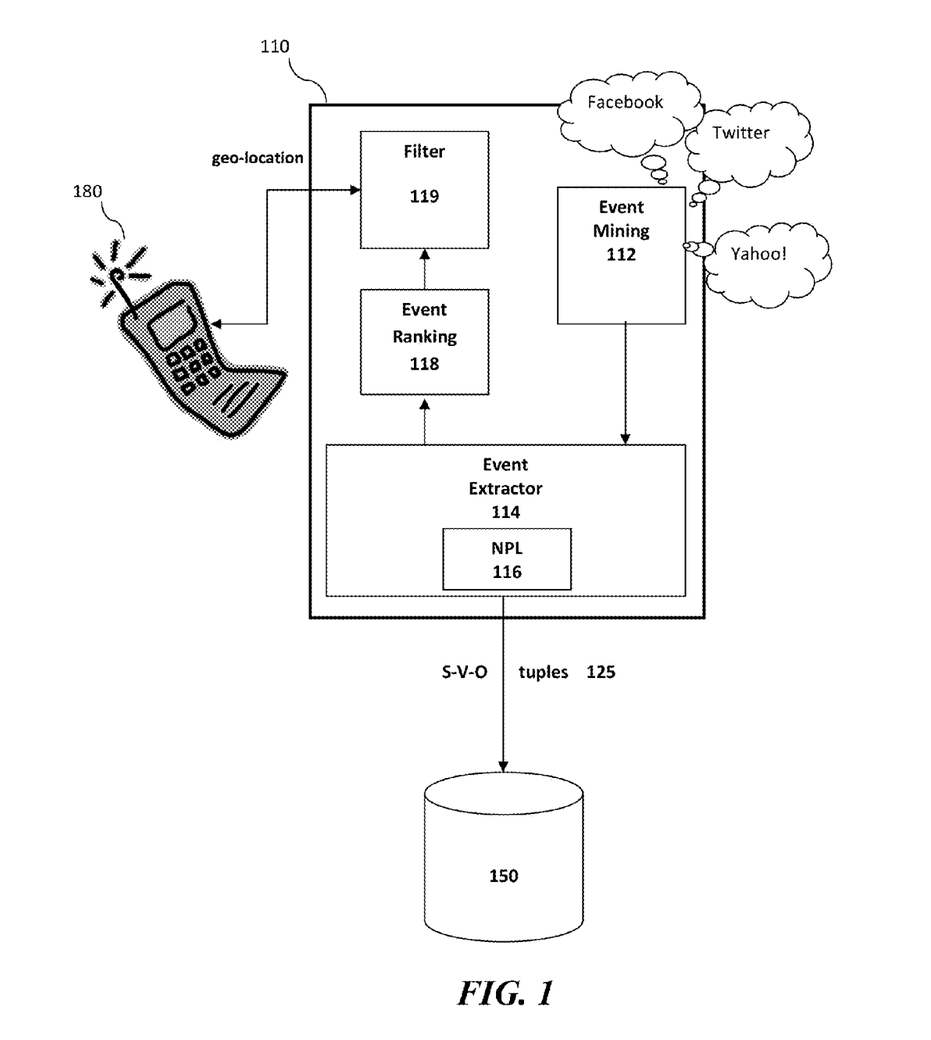
FIG. 1 is a simplified block diagram of a system configured to operate according to an embodiment of the present invention.

We describe a mobile-based real time geo-sensitive social event recommendation engine with a graphic human-mobile interface. Referring now in specific detail to the drawings, and particularly to FIG. 1, there is provided a simplified block diagram depicting a mobile-based real-time location-sensitive social event engine 110, according to an embodiment of the present invention. The engine 110 includes components such as the Event Mining component 112, the Event Extractor 114 which operates according to a Natural Language Processing (NLP) 116, an Event Ranking component 118, and a Filter 119. The components may be separate physical components of a computer system, or they may be logical components housed within one processor. The engine 110 is operably coupled with a data store 150 where it stores extracted <subject-verb-object> (S-V-O) tuples. SVO identification is a well-defined task in natural language processing (NLP). It is used to identify the key subject, verb, and object from a sentence. We use SVO identification to identify the key subject, verb, and object from a Tweet or Facebook update.

The Event Mining component 112 mines data from sources such as Twitter, Facebook and Yahoo! Social Updates. This mined data is fed into the Event Extractor 114 which then processes the data into S-V-O tuples 125. The tuples 125 are stored in the data store 150. The Event Ranking component 118 takes the extracted tuples 125 of events and ranks those events that are most likely to appeal to the user of the mobile device 180. The Filter 119 then performs a filtering algorithm based on the geo-location of the user's mobile phone 180 to further refine the output to include only those events that are most likely to appeal to the user and are within a reasonable distance from the user.

Figure 2:
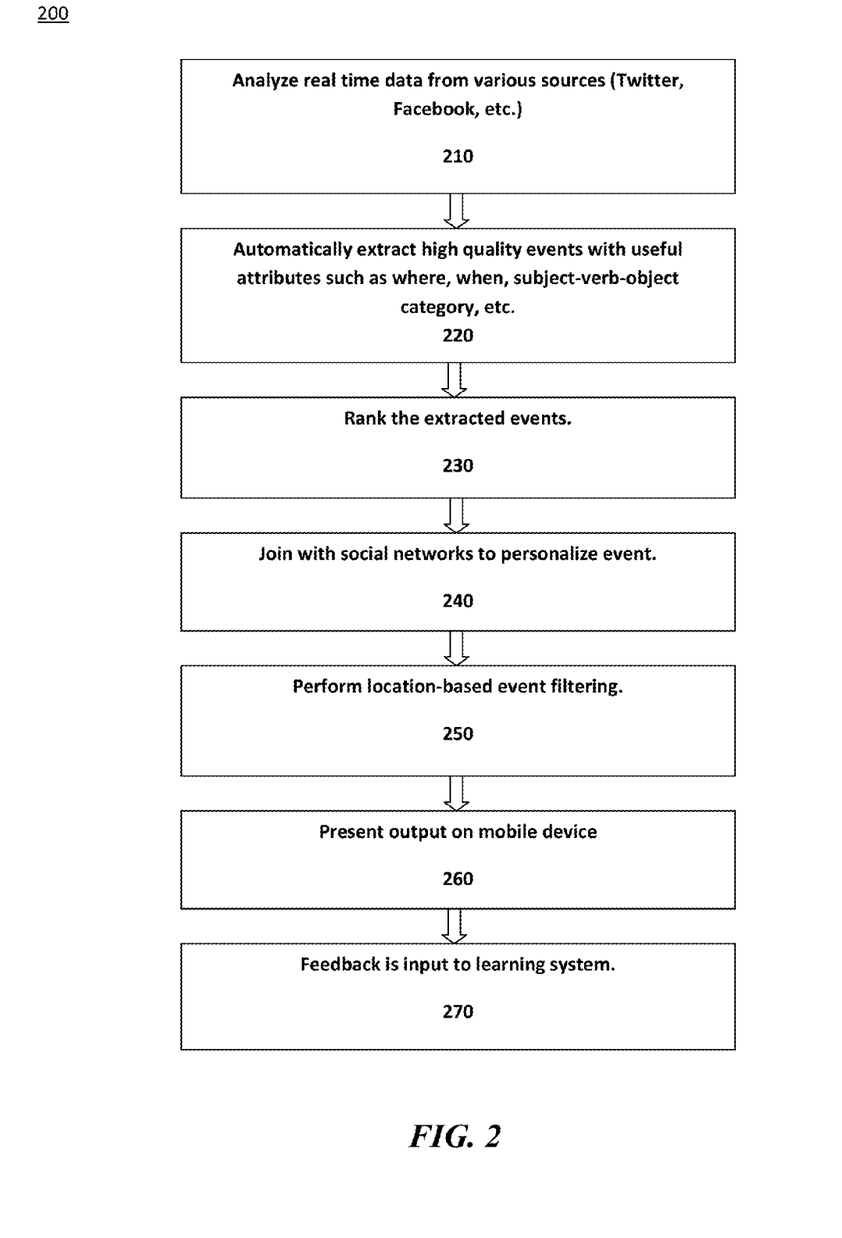
FIG. 2 is a flowchart of a method according to an embodiment of the invention.

Referring now to FIG. 2 there is provided a high-level flowchart 200 of the process for providing mobile-based real-time location-sensitive, social events, according to an embodiment of the present invention. In step 210 we mine and analyze real-time feeds from Twitter, Facebook, Yahoo! Social Updates, blogs, breaking news, and the like in order to uncover events in which the mobile device user might be interested.

We look for and in step 220 extract high-quality events with various useful attributes such as location, date/time, subject-verb-object (SVO) category, and the like. We assume that a social event takes the form of "who (subject) does (verb) what (object)" with additional attributes such as when and where. For example, given an event like "Chicago Bulls beats Lakers, 99-90 at the Rose Garden this Thursday evening," Chicago Bulls, beat, and Lakers would be subject, verb, and object, respectively. The when and where are Thursday evening and Rose Garden, respectively.

We can perform this extraction within the WOO framework (used for generating websites and blogs). This is just one example, however; we can use any web tool that provides an easy-to-use interface and still remain within the spirit and scope of the invention. The events are extracted using the SVO format. Any sentence not taking the SVO form would not be considered as an important event; thus it would not be extracted. Conversely, taking the form of SVO is not sufficient to be categorized as an important event; therefore we need to further classify and rank the events.

We focus our event extraction on real-time social data such as Twitter, Facebook, Yahoo! Pulse updates, and other real-time updates, Blogs, local breaking news, and the like. NLP (natural language processing) technologies can be used to successfully extract events. We populate our real-time database 150 with SVO (subject-verb-object) tuples 125, when, where, popularity, event category, and so forth.

In step 230 we rank the extracted events according to various attributes, including, but not limited to: categories of personal interests, distance to the center of circle (if using a circular location-bounding app), personal relevance, recency, social relevance (how many users from your social circle plan to attend or showed interest, etc.). Up to this point, steps 210, 220, and 230 can be performed on a continuous basis as feeds are received. In an alternative embodiment, however, these steps and the subsequent steps are only performed when a user prompt is received.

Figure 4:
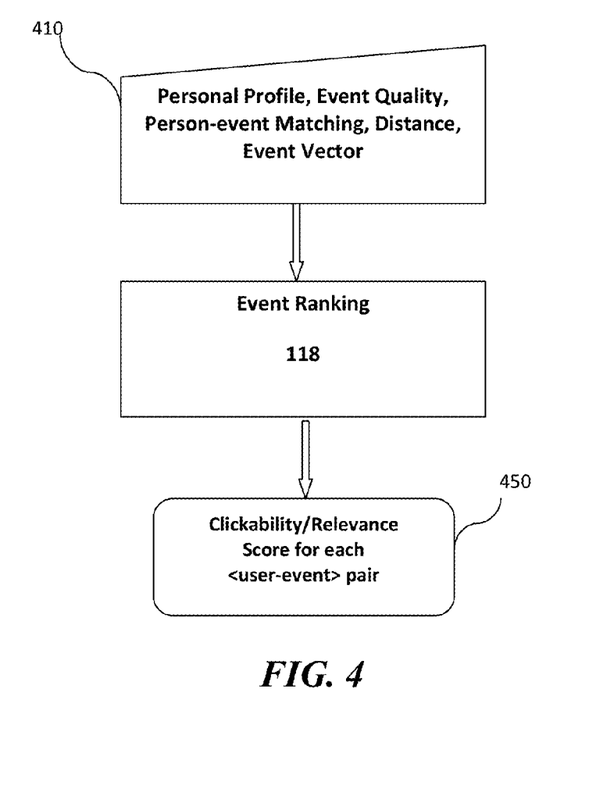
FIG. 4 is a data flow diagram of event ranking, according to an embodiment of the present invention.

Referring now to FIG. 4, based on our understanding of users, we build a personalized relevance ranking or recommendation function 118 which takes as inputs 410 features such as an event quality score, distance, personal profile vector, event vector, person-event matching features, and the like. The output of this ranking function 118 is a clickability/relevance score for each <user/event> pair 450. Given a user, we then rank the events according to the corresponding clickability scores.

Some event features taken as input 410 are:

1. The event quality score: this score mainly indicates the importance or significance of an event itself (independent of users). It may be obtained by another machine learned model taking into consideration for example the confidence score of the event provided by the event extraction system 110, the popularity of subject and object, the number of users Tweeting about the event, the number of comments on this event in Facebook, and so on.

2. Distance: the physical distance between the user and an event location.

3. Personal profile vector: the feature vector representation for a user based on his/her behavior data such as searched queries, viewed/clicked web pages, posted tweets/social updates, etc. the simplest version could be keyword vectors.

4. event vector: the feature vector representation for an event. the simplest version could be keyword vectors.

5. person-event matching features: based on 3 and 4, one can derive various matching features such as the dot product of the two vectors.

In step 240 we join data from the user's social networks to provide personalized information such as who from the user's social circle is interested in attending the events, or who has talked about it. In one embodiment, if we know what social connections are interested in attending what events, we can provide a Groupon-like service to book the tickets together so that the friends can receive discounts. Adding to this, we can build a real-time forum for the social connections to share opinions/feedback on the same events real-time. If it is a recurrent event, we can build an event-based social network.

Figure 3A:
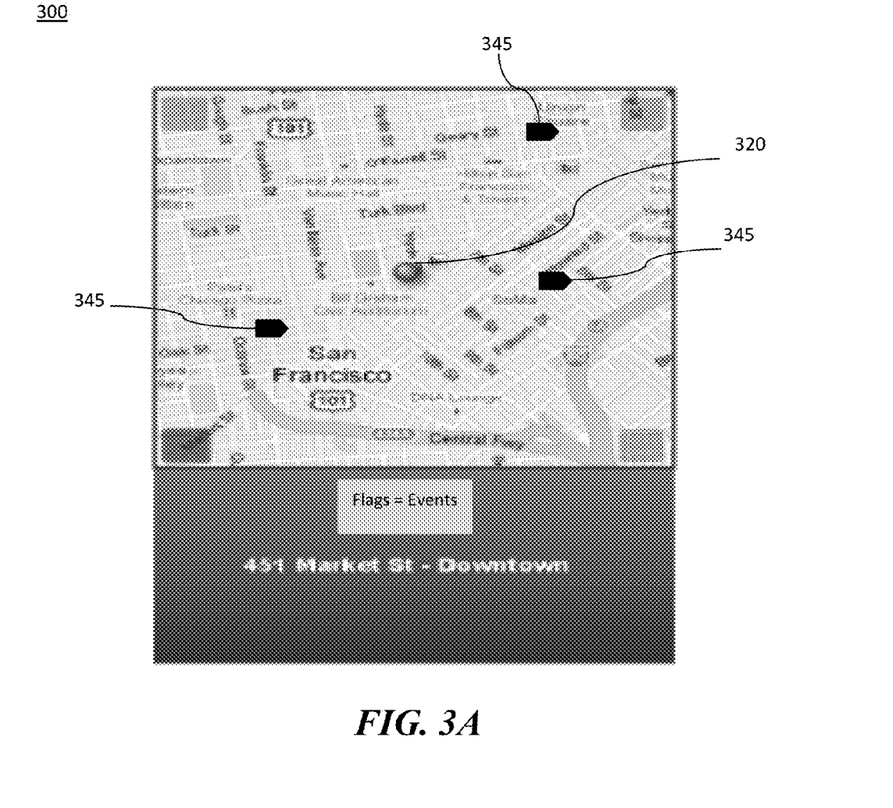
FIG. 3A shows an exemplary illustration of the display of events on a mobile device, according to an embodiment of the present invention.
Figure 3B:
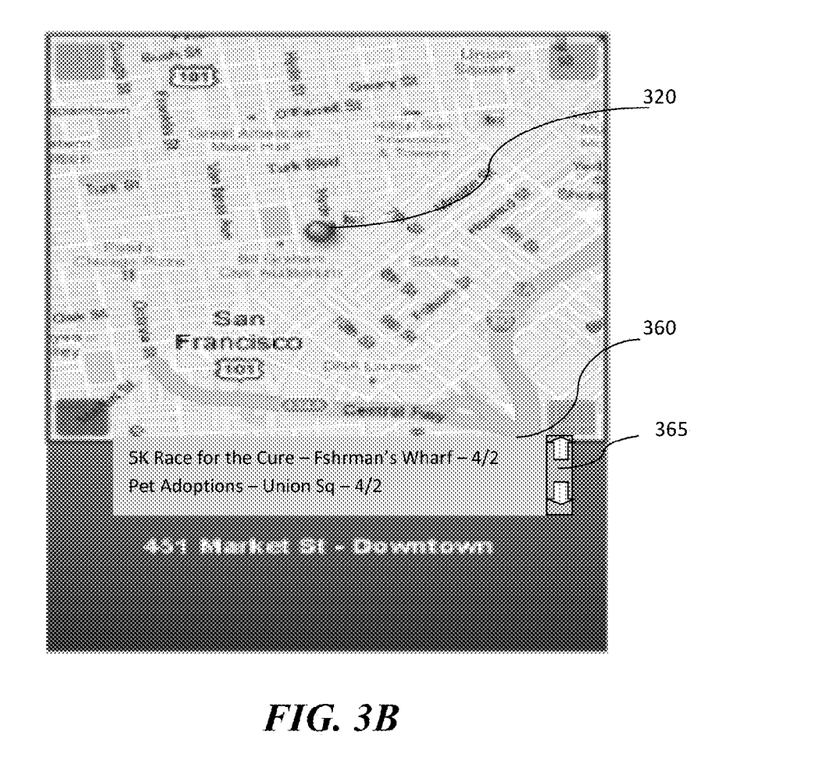
FIG. 3B shows an exemplary illustration of the display of events on a mobile device, according to another embodiment of the present invention.

In step 250 we perform location-based event filtering. Based on the geo-location indication received from a user's mobile device 180, we perform a distance-based filtering on the event database 150 and retain those events close to the user's specified location/area. In step 260 we present the results to the user on the mobile device 180. FIGS. 3A and 3B show exemplary illustrations of a display of events selected for the user. In both FIGS. 3A and 3B the user's location is displayed in the center of a map overlay on the user's screen at position 320. In FIG. 3A the events selected for the user are represented by flags 345 at their respective locations. Using a mobile app gateway the interface shown in FIG. 3A allows the user to click on an event flag 345 to see more information about the event.

Figure 6:
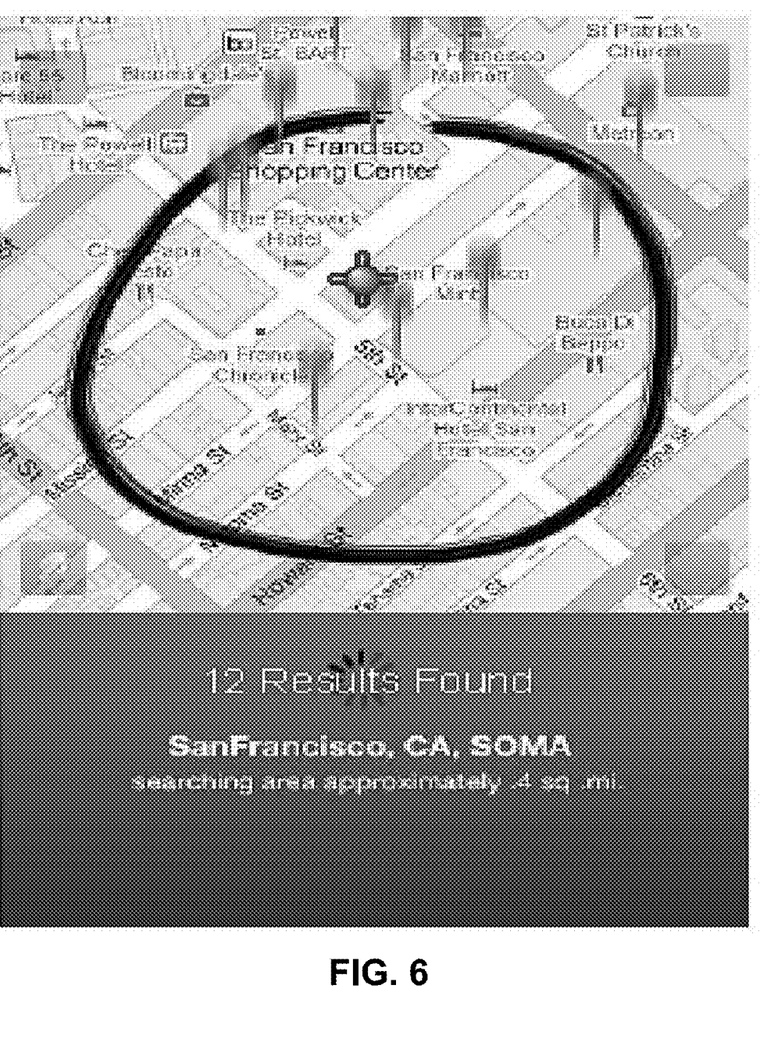
FIG. 6 is an exemplary illustration of how a geo-location can be specified, according to an embodiment of the present invention.

Referring now to FIG. 6 we show one embodiment wherein the user has drawn a circle (or closed contour of any shape) on a map. This technology was disclosed in commonly-owned co-pending U.S. patent application Ser. No. 12/862,324, filed on Aug. 24, 2010 and entitled "Haptic Search Feature for Touch Screens." The system will pop up the personally interesting social events happening or scheduled to happen in the location bounded the shape drawn by the user.

In FIG. 3B we show the same interface of FIG. 3A, but the events are displayed in a scrollable bar 360. Here the events are displayed in a what-where-when format, but different formats can be used within the spirit and scope of the invention. If the events are too numerous to display all at once, the scroll feature 365 can be used.

We can also automatically push events to the user's mobile device 180 based on where the user is right now, as obtained from geo-location within the mobile 180. In this scenario we could alert the user to check his/her messages for an event notification.

In step 270 when online user click feedback is available, we store it in a learning data store to build an online learning system to take advantage of user real time click feedbacks to further refine the offline ranking/recommendation function. Each event is assigned a confidence score based on the quality of data sources, our ML (machine learning) based extraction confidence, etc. It will also be classified into predefined event categories.

Event extraction can be performed on an ongoing and recurring basis whenever new Tweet or Facebook feeds become available in the pipeline. The system analyzes the new feeds and extracts the social events, either pushing them to the user or storing them in a data store until the user requests them.

Hardware Embodiment.

Figure 5:
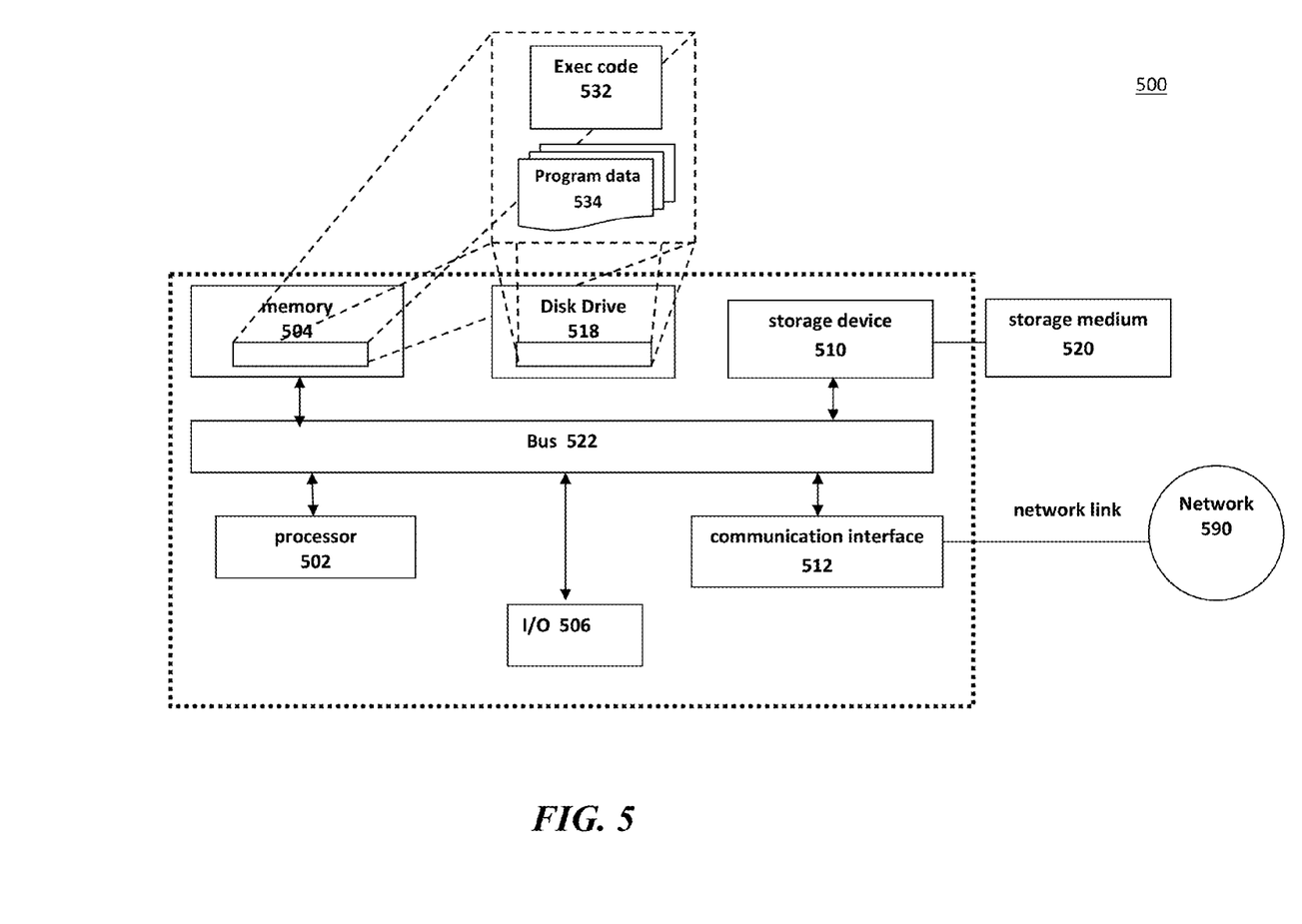
FIG. 5 is a high level block diagram showing an information processing system according to another embodiment of the invention.

Referring now to FIG. 5, there is provided a simplified pictorial illustration of an information processing system 500 in which the present invention may be implemented. For purposes of this invention, computer system 500 may represent any type of computer, information processing system or other programmable electronic device, including a client computer, a server computer, a portable computer, an embedded controller, a personal digital assistant, and so on. The computer system 500 may be a stand-alone device or networked into a larger system. Computer system 500, illustrated for exemplary purposes as a networked computing device, is in communication with other networked computing devices (not shown) via network 510. As will be appreciated by those of ordinary skill in the art, network 510 may be embodied using conventional networking technologies and may include one or more of the following: local area networks, wide area networks, intranets, public Internet and the like.

Throughout the description herein, an embodiment of the invention is illustrated with aspects of the invention embodied solely on computer system 500. As will be appreciated by those of ordinary skill in the art, aspects of the invention may be distributed amongst one or more networked computing devices which interact with computer system 500 via one or more data networks such as, for example, network 510. However, for ease of understanding, aspects of the invention have been embodied in a single computing device—computer system 500.

Computer system 500 includes processing device 502 which communicates with various input devices, output devices and network 510. The processor 502 is connected to a communication infrastructure 522 (e.g., a communications bus, cross-over bar, or network). The processor device 502 may be a general or special purpose microprocessor operating under control of computer program instructions executed from memory 504. The processor may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips. The memory may be partitioned or otherwise mapped to reflect the boundaries of the various memory subcomponents.

Memory 504 includes both volatile and persistent memory for the storage of: operational instructions for execution by CPU 502, data registers, application storage and the like. Memory 504 preferably includes a combination of random access memory (RAM), read only memory (ROM) and persistent memory such as that provided by a hard disk drive. The computer instructions/applications stored in memory 504 and executed by processor device 502.

The I/O subsystem 506 may comprise various end user interfaces such as a display, a keyboards, and a mouse. The I/O subsystem 506 may further comprise a connection to a network such as a local-area network (LAN) or wide-area network (WAN) such as the Internet. The computer system may include a display interface 508 that forwards graphics, text, and other data from the communication infrastructure 502 (or from a frame buffer not shown) for display on the display unit 510. The computer system also includes a main memory 504, preferably random access memory (RAM), and may also include a secondary memory 512. The secondary memory 512 may include, for example, a hard disk drive 514 and/or a removable storage drive 511, representing a floppy disk drive, a magnetic tape drive, an optical disk drive, etc. The removable storage drive 511 reads from and/or writes to a removable storage unit 518 in a manner well known to those having ordinary skill in the art. Removable storage unit 518, represents a floppy disk, a compact disc, magnetic tape, optical disk, etc. which is read by and written to by removable storage drive 511. As will be appreciated, the removable storage unit 518 includes a computer readable medium having stored therein computer software and/or data.

The computer system may also include a communications interface 524. Communications interface 524 allows software and data to be transferred between the computer system and external devices. Examples of communications interface 524 may include a modem, a network interface (such as an Ethernet card), a communications port, a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (i.e., channel). This channel carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to non-transitory media such as main memory and secondary memory, a removable storage drive, and a hard disk installed in hard disk drive. These computer program products are means for providing software to the computer system. The computer readable medium allows the computer system to read data, instructions, messages or message packets, and other computer readable information from the computer readable medium.

Therefore, while we have described different embodiments, it will be understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

I claim:

1. A method for performing an on-line recommendation, said method comprising:
    using a processor device coupled with a mobile device, performing:
        mining real-time data from various sources;
        analyzing the real-time data to uncover events;
        determining, from the analysis, the events in which a user of the mobile device may be interested, by:
            identifying key subject, verb, and object from the real-time data;
            ignoring any events not in a subject-verb-object format; and
            identifying additional attributes of the events from the real-time data;
        extracting only the events in subject-verb-object format;
        storing the extracted events in a data store as subject-verb-object tuples;
        storing the additional attributes; and
        performing a recommendation function, comprising:
            using the identified additional attributes, ranking the extracted events to determine high-quality events as the events in which the user is more likely to be interested;
            performing location-based filtering, further narrowing the high-quality events to those events within a geo-location range proximate to the mobile device; and
            retaining only those filtered, high-quality events, providing said retained events to the user as optimal events most likely to interest said user;
            linking with the user's social network; and
            providing personalized details derived from the user's social network along with the optimal events.

2. The method of claim 1 further comprising:
receiving user click feedback on the events; and
storing the user click feedback used to refine the recommendation function.

3. The method of claim 1 wherein providing the optimal events comprises presenting the optimal events on the mobile device.

4. The method of claim 1 further comprising receiving a request from the user of the mobile device, wherein said request comprises the geo-location range.

5. The method of claim 4 further comprising receiving an image specifying coordinates of the geo-location range.

6. The method of claim 1 wherein analyzing the real-time data comprises mining real-time feeds from multiple websites.

7. The method of claim 1 wherein ranking the extracted events comprises:
    ranking the events into categories according to attributes selected from a group consisting of: categories of personal interest, distance, personal relevance, recency, and social relevance.

8. The method of claim 3 wherein presenting the optimal events comprises pushing the events to the user's mobile device based on the user's geo-location as obtained from said mobile device.

9. An information processing system for performing an on-line recommendation, said information processing system comprising:
    a memory with computer-executable instructions stored therein, said computer-executable instructions comprising:
        mining real-time data from various sources;
        analyzing the real-time data to uncover events;
        determining, from the analysis, the events in which a user of a mobile device may be interested, by:
            identifying key subject, verb, and object from the real-time data;
            ignoring any events not in a subject-verb-object format; and
            identifying additional attributes of the events from the real-time data;
        extracting only the events in subject-verb-object format;
        storing the extracted events in a data store as subject-verb-object tuples;
        storing the additional attributes; and
        performing a recommendation function, comprising:
            using the identified additional attributes, ranking the extracted events to determine high-quality events as the events in which the user is highly likely to be interested;
            performing location-based filtering, further narrowing the high-quality events to those events within a geo-location range proximate to the mobile device; and
            retaining only those filtered, high-quality events, providing said retained events to the user as optimal events most likely to interest said user;
            linking with the user's social network; and
            providing personalized details derived from the user's social network along with the optimal events; and
    a processor device operably coupled with the memory, said processor device executing the computer-executable instructions.

10. The information processing system of claim 9 further comprising: the data store also storing user click feedback used to refine the recommendation function.

11. The information processing system of claim 9 further comprising: an input/output interface receiving a request from the user of the mobile device, wherein said request comprises the geo-location range.

12. The information processing system of claim 11 wherein the input/output interface further receives an image specifying coordinates of the geo-location range.

13. The information processing system of claim 9 wherein ranking the extracted events comprises ranking the events into categories according to attributes selected from a group consisting of: categories of personal interest, distance, personal relevance, recency, and social relevance.

14. The information processing system of claim 11 further comprising presenting the optimal events by pushing the events to the user's mobile device based on the user's geo-location as obtained from said mobile device.

15. A computer program product comprising a computer-readable storage medium with computer instructions stored therein, said computer instructions causing a computer to perform:
    mining real-time data from various sources;
    analyzing the real-time data to uncover events;
    determining, from the analysis, the events in which a user of a mobile device may be interested, by:
        identifying key subject, verb, and object from the real-time data;

ignoring any events not in a subject-verb-object format; and identifying additional attributes of the events from the real-time data;

extracting only the events in subject-verb-object format;

storing the extracted events in a data store as subject-verb-object tuples;

storing the additional attributes; and performing a recommendation function, comprising:

using the identified additional attributes, ranking the extracted events to determine high-quality events as the events in which the user is highly likely to be interested;

performing location-based filtering, further narrowing the high-quality events to those events within a geo-location range proximate to the mobile device; and retaining only those filtered, high-quality events, providing said retained events to the user as optimal events most likely to interest said user;

linking with the user's social network; and providing personalized details derived from the user's social network along with the optimal events.

* * * * *